United States Patent [19]
Curb et al.

[11] Patent Number: 5,432,898
[45] Date of Patent: Jul. 11, 1995

[54] SYSTEM AND METHOD FOR PRODUCING ANTI-ALIASED LINES

[75] Inventors: Lisa A. Curb, Round Rock; Chandrasekhar Narayanaswami; Avijit Saha, both of Austin, all of Tex.

[73] Assignee: International Business Machines Corporation, Armonk, N.Y.

[21] Appl. No.: 123,545

[22] Filed: Sep. 20, 1993

[51] Int. Cl.⁶ ............................................. G06F 15/68
[52] U.S. Cl. .................................................. 395/143
[58] Field of Search ............... 395/141, 142, 143, 119, 395/125; 345/135, 136, 137

[56] References Cited

U.S. PATENT DOCUMENTS

| | | | |
|---|---|---|---|
| 4,607,340 | 8/1986 | Nagai | 364/521 |
| 4,617,592 | 10/1986 | MacDonald | 358/80 |
| 4,675,743 | 6/1987 | Riseman et al. | 358/263 |
| 4,677,482 | 6/1987 | Lewis, Jr. | 358/140 |
| 4,678,969 | 7/1987 | Schwerdt et al. | 315/382 |
| 4,729,098 | 3/1988 | Cline et al. | 364/414 |
| 4,769,635 | 9/1988 | Ishizaka | 340/723 |
| 4,819,185 | 4/1989 | Corona et al. | 364/518 |
| 4,843,380 | 6/1989 | Oakley et al. | 340/723 |
| 4,899,294 | 2/1990 | Easton et al. | 364/522 |
| 4,960,061 | 10/1990 | Tajima et al. | 112/103 |
| 4,967,375 | 10/1990 | Pelham et al. | 364/518 |
| 5,202,671 | 4/1993 | Aranda et al. | 340/797 |
| 5,214,753 | 5/1993 | Lee et al. | 395/125 |
| 5,237,650 | 8/1993 | Priem et al. | 395/143 |
| 5,287,442 | 2/1994 | Alcorn et al. | 395/143 |

OTHER PUBLICATIONS

F. Crow, "The Aliasing Problem in Computer-Generated Shaded Images," Communications of the ACM, vol. 20, pp. 750–752, Nov. 1962.
S. Gupta and R. F. Sproull, "Filtering Edges for Gray Scale Displays," Computer Graphics, vol. 15, pp. 1–5, Aug. 1981.
J. D. Foley, A. van Dam, S. K. Feiber, J. F. Hughes. Computer Graphics Principles and Practice, Addison-Wesley Publishing Company, 1990.
G. Pimichter, "Double-error Antialiasing Algorithm," IBM Technical Disclosure. Mar. 1985.
M. Aranda, "Antialiasing in the GT04." Computer Graphics, Aug. 1982.
"Anti-Aliasing Video Lookup Table," IBM Technical Disclosure Bulletin, vol. 27, No. 10B, Mar. 1985.
D. F. Bantz, "Elimination of 'Staircasing' In a Raster Display," IBM Technical Disclosure Bulletin, vol. 18, No. 9, Feb. 1976.
Computer Graphics, vol. 25, No. 4, Jul. 1991, "An Efficient Antialiasing Technique", X. Wu et al, pp. 143–152.
Graphics Reference Manual, Silicon Graphics Inc. (SGI), Jan. 1990, pp. 143–152.

Primary Examiner—Phu K. Nguyen
Attorney, Agent, or Firm—Mark S. Walker; George E. Clark

[57] ABSTRACT

A system and method for providing a data processing system operable for displaying anti-aliased lines on a display device comprised of a matrix array of pixels. This system receives data pertaining to the line to be displayed, the line being defined by start and end points which position the line relative to the pixels within the matrix array. The relative position of the line with respect to pairs of pixels bounding the line are ascertained. The illumination intensities for each pixel within each pair is then dependent upon this relative position. The relative positions are ascertained by subdividing the matrix array of pixels into subpixel regions so that the subpixel nearest the intersection of the line and a theoretical boundary intersecting the pairs of pixels may be established. Illumination intensities for bounding pixels near the end points of the line are also established in the same manner and are then reduced in intensity relative to the distance from the end point to a theoretical boundary intersecting these bounding pixels.

12 Claims, 6 Drawing Sheets

| <2MSB MIX \|\| 2MSB DISTANCE> | RESULTING END POINT MIX VALUES |
|---|---|
| 0000 | 0000 |
| 0001 | 0000 |
| 0010 | 0000 |
| 0011 | 0000 |
| 0100 | 0010 |
| 0101 | 0001 |
| 0110 | 0000 |
| 0111 | 0000 |
| 1000 | 1000 |
| 1001 | 0101 |
| 1010 | 0001 |
| 1011 | 0000 |
| 1100 | 1011 |
| 1101 | 1000 |
| 1110 | 0011 |
| 1111 | 0000 |

SYSTEM AND METHOD FOR PRODUCING ANTI-ALIASED LINES

TECHNICAL FIELD OF THE INVENTION

The present invention relates to data processing systems for displaying graphical data, and more particularly, to a data processing system that provides anti-aliasing of displayed straight lines.

BACKGROUND OF THE INVENTION

Since the early days of workstations and graphics displays, some display terminals have utilized an electron beam controlled by the computer system that literally draws the picture on the face of the display, which is coated with phosphorus. To draw a line, an electron gun is instructed to turn on its beam at a certain beginning point, move in a line to the end point, and then shut off the beam. The result is a smooth, continuous line. Such vector displays provide superior resolution and adequate speed when drawing simple diagrams. However, the disadvantage of a vector based system is that when the diagram to be drawn is more complex, the electron beam is unable to draw the entire picture and then refresh it before the "glow" of the phosphorus begins to fade, resulting in a "flickering" of the drawing. Additionally, how fast the electron beam can draw the entire image limits the display of dynamically changing images.

Raster technology, unlike vector technology, uses a screen painted with a pattern of phosphorus dots called pixels. The electron gun sweeps horizontally across the screen, gradually moving up and down the display in a zigzag pattern. Rather than draw a continuous line, the electron gun lights individual pixels as it sweeps across the screen. When human eyes see lit pixels, they "connect the dots" to create the optical illusion of a continuous line. The closer the dots, the more continuous the line appears to be.

However, the problem with raster based resolution is that the optical illusion is not sufficiently accurate for all applications. This is because raster displays can only display an approximation of the required picture.

The most noticeable result of this approximation is when a displayed straight line is drawn at angles other than exactly vertical or horizontal. The result is an aliasing of the straight line having a "jagged" appearance.

Nevertheless, raster displays are often desired over vector based systems because of their speed, versatility, cost savings over vector based systems, and ability to provide a significantly broader color range. Thus, there is a need in the art for a system and method for smoothing of graphical lines within a raster based display system.

Several methods have been proposed for smoothing out "jaggies." One method, disclosed within *Fundamentals of Interactive Computer Graphics*, by Foley, et al., Addison-Wesley Publishing Co., 1990, which is incorporated herein by reference, utilizes Bresenham's line algorithm (described in further detail below), which causes the pixels lying nearest to the desired line to be illuminated. Unfortunately, this still produces "jaggies" and makes the line look more like a staircase than a smooth line when the line is almost vertical or almost horizontal.

Another prior art method reduces the intensity of the line near the location of a "step." The effect desired is for the human eye to naturally join up the two parts of the line so that the brain completes the illusion by refusing to see the step. This method does require slight modification since the eye will tend to see two pixels lit at half intensity as dimmer than one pixel at full intensity. The disadvantage of this method is that the line continues to retain a semblance of the step and requires a considerable amount of processing time to determine the intensities of each pixel.

Another anti-aliasing method, known as exact area anti-aliasing, determines the intensity of a pixel as being proportional to the area of the pixel covered by the desired line. The disadvantage to this method is a blurring of the line edges.

Generally, the prior art methods do not sufficiently smooth out jaggies without degrading the appearance of the line, and generally require a considerable amount of additional hardware to implement.

Thus, there is a need in the art for a system and method for providing anti-aliasing for displayed lines in a graphics display system.

There is an additional need in the art for an anti-aliasing system and method that does not significantly degrade the performance and speed of the graphics display system.

There is yet another need in the art for an anti-aliasing system and method for displaying lines within a graphics display that utilizes a minimum amount of hardware to implement.

SUMMARY OF THE INVENTION

Thus, it is a primary object of the present invention to provide a system and method for anti-aliasing of lines within a data processing system having graphics capabilities, which requires a minimum amount of hardware to implement and does not degrade the performance or speed of the display system.

In the attainment of the above primary object, the present invention provides anti-aliasing of a displayed straight line by illuminating pairs of pixels bounding each side of the straight line all along its path in proportion to the pixels' distance from the desired line. This is accomplished by effectively subdividing the distance between each pair of pixels within the pixel array of the display into 16 subpixel regions. Then, a determination is made of which subpixel the line is nearest so that the illuminations of each of the two bounding pixels can be established. Note that these subpixels are not actual locations where pixels reside, but are merely used within the present invention to determine within a desired accuracy where a straight line lies between two adjacent pixel locations.

Though the invention is described herein with respect to a straight line lying within the first octant (a line increasing in the x direction at a rate greater than its increase in the y direction and on a vector lying between 0° and 45° in a Cartesian coordinate system), the present invention is operable to provide anti-aliasing for a displayable straight line at any angle and direction.

In a preferred embodiment of the invention, the beginning and end points of the straight line and their desired relative position with respect to the array of pixels on the display is used to determine several variables for utilization within Bresenham's midpoint algorithm, such as described within *Algorithm for Computer Control of Digital Plotter*, Bresenham, J. E., IBM Syst. J., 1965, which is herein incorporated by reference.

Bresenham's algorithm is utilized since it eliminates the need for multiplication and division operations, which require a considerable amount of hardware to implement and excessive computer cycles to operate.

Since most lines will not begin or end at the exact location of a pixel or even at a straight line boundary between two vertically aligned pixels, a special process, to be described below, is required to determine the illuminations for the two vertically aligned pixels occurring at the boundary lying just outside of each end of the straight line. Hereinafter, each vertical boundary between pixels lying on each side of the straight line will be referred to as x integer boundaries.

First, the present invention determines the coordinates of the intersection between the first x integer boundary crossed by the line and the line. This is accomplished by ascertaining the determinant of the midpoint between the two subpixels bounding the line at the first integer boundary. This will indicate which of the subpixels the line is nearest. From that the illumination intensity of the top pixel is established as proportional to the ratio of the distance between the chosen subpixel and the bottom pixel to the total distance between the top and bottom pixels (assuming a display background intensity of zero). Correspondingly, the illumination intensity of the bottom pixel is proportional to the ratio of the distance between the top pixel and the chosen subpixel to the total distance between the two pixels.

Next, a correction factor is determined that is dependent upon the previously processed determinant factor. This correction factor is summed with the previously processed determinant in order to provide the determinant at the next x integer boundary surpassed by the straight line. In the manner previously described, this new determinant value is also utilized to establish the subpixel along this next x integer boundary nearest the straight line to again provide the correct ratios for illuminating those top and bottom pixels bounding the straight line at that particular x integer boundary. This process is continued along each x integer boundary until the end of the line is reached.

At the end points of the straight line, the straight line is extrapolated to the previous x integer boundary in the case of the start point, and to the subsequent x integer boundary with respect to the end point. The determinant is again calculated at the intersection of the extrapolated straight line and the x integer boundary to determine which subpixel the extrapolated line is nearest. Additionally, the distance in the x direction between the start point, or end point, and the extrapolated x integer boundary is determined. Thereafter, the illumination intensity factors of the top and bottom pixels bounding the extrapolated straight line at the extrapolated x integer boundary are determined in the same manner previously described, while also factoring in the distance between the start point, or end point, and the extrapolated x integer boundary. These intensity factors are then used to index an empirically derived look-up table for the exact illumination intensity mix values for each pixel to be passed to the video frame buffer.

In a preferred embodiment, a state machine implements a major portion of the invention within a data processing system. Upon invocation of the anti-aliasing process, the state machine receives the start point and end point of the desired line and begins to process the various variables previously described. As the illumination intensities of each pair of pixels, top and bottom, bounding the desired line are determined, look up tables are utilized to provide the mix values for the pixels to be passed on to a frame buffer interface, which gathers the various mixed values before using them to display the image including the straight line on a graphical display device.

The use of the state machine reduces the number of latches and adders required to implement the present invention since it stores the various variables in latches until they are each needed and then supplies the required variables to the adders for whichever computation is needed at a particular state. The final illumination mix values are passed to a frame buffer before transfer to the display.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 included

DETAILED DESCRIPTION OF A PREFERRED EMBODIMENT OF THE INVENTION

The following discussion will reference a straight line in the form of the equation:

$$ax + by + c = 0 \qquad \text{(Equation 1)}$$

Figure 1:
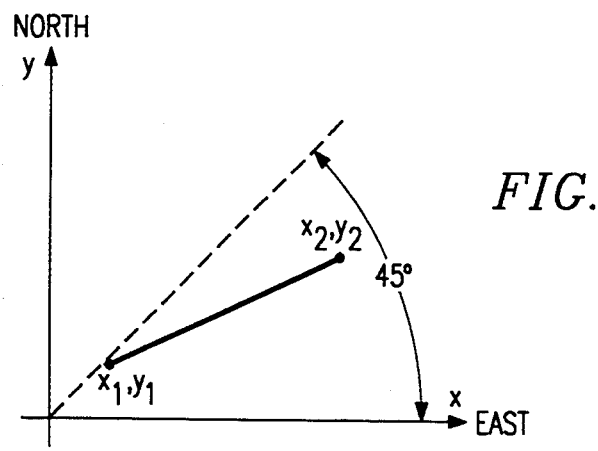
FIG. 1 illustrates a straight line within the first octant of a Cartesian coordinate system.

FIG. 1 illustrates such a line having a start point at $x_1$, $y_1$ and an end point at $x_2$, $y_2$. The line will be referenced as lying within the first octant in a Cartesian coordinate system (i.e., $x \geq 0$, $y \geq 0$, $dx \geq dy$ ($dx = x_2 - x_1$, $dy = y_2 - y_1$)).

Additionally, reference will be made to a direction of the line as traversing in an "x major direction" or a "y major direction." Essentially, a line traversing in an x major direction has an angle of less than or equal to 45° with respect to the x axis ($dx \geq dy$), and a line traversing in a y major direction has an angle of greater than 45° with respect to the x axis ($dy > dx$). Furthermore references to "north" and "east" will be as shown in FIG. 1.

Figure 2A:
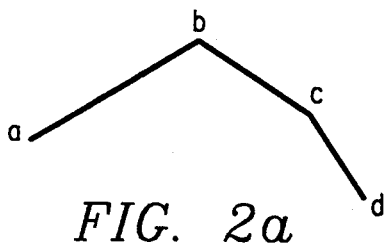
FIG. 2a illustrates a polyline.
Figure 2B:
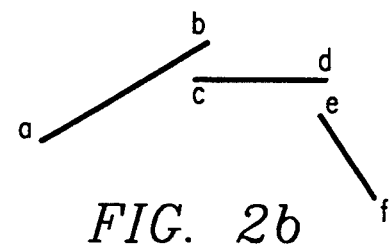
FIG. 2b illustrates a polysegment.

Additionally, a polyline will refer to successive and connected straight lines having end points a, b, c, d, as illustrated in FIG. 2a. Polysegments will refer to discontinuous straight lines, having end points a, b, c, d, e, f, as illustrated in FIG. 2b.

Figure 3:
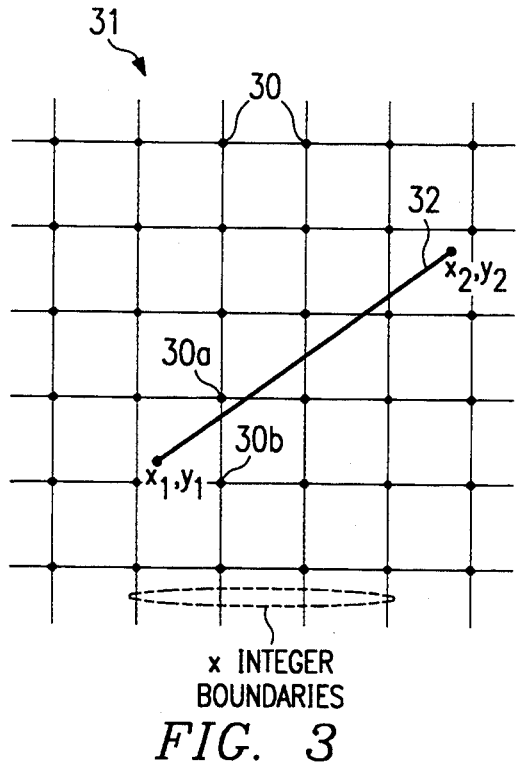
FIG. 3 illustrates a desired straight line within a pixel array.

Referring next to FIG. 3, there is illustrated straight line 32, which is a representation of a zero width line that is desired to be displayed on a raster-based display device (display 1208 in FIG. 12) incorporating pixel grid 31 comprised of numerous pixels 30. This illustration shows the obvious disadvantage of utilizing a raster-based device for displaying straight lines such as straight line 32. Straight line 32 would not appear as shown, since there are not any pixels 30 lying exactly along straight line 32 between end points $x_1$, $y_1$ and $x_2$, $y_2$. The only manner in which straight line 32 could be displayed as shown would be if there existed an almost infinite number of "minipixels" along the straight line path between end points $x_1$, $y_1$ and $x_2$, $y_2$.

Figure 4:
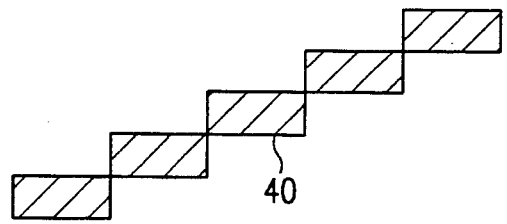
FIG. 4 illustrates an aliased straight line.

Instead, unless specialized methods (such as the one described herein) are used to smooth out the display of straight line 32, straight line 32 will be displayed in a jagged fashion as shown in FIG. 4 by jagged line 40.

As previously described, prior art methods for smoothing out jagged line 40 either fail to adequately perform for all line angles, including those near vertical and near horizontal, or the methods require considerable hardware additions that are complex and expensive to implement. The present invention to be described performs the task of anti-aliasing in an economical and efficient manner.

Referring back to FIG. 3, it may be seen that any desired straight line, such as straight line 32, will pass between at least one pair of adjacent and vertically aligned pixel locations, such as pixels 30a and 30b. The exception is for straight line 32 to lie exactly on top of a pixel location (not illustrated).

The vertical distance of straight line 32 from both pixels 30a and 30b at the point where straight line 32 intersects the vertical boundary interconnecting pixels 30a and 30b (x integer boundary) is determined. Pixel 30a is illuminated in proportion to the ratio of the distance between 30b and the intersection of straight line 32 and the x integer boundary, which includes pixels 30a and 30b, and the distance between pixels 30a and 30b. Likewise, pixel 30b is illuminated in proportion to the ratio of the distance between pixel 30a and the aforementioned intersections and the distance between pixels 30a and 30b. In other words, since straight line 32 lies nearer to pixel location 30a than it does to pixel location 30b, pixel 30a is illuminated brighter than pixel 30b.

Figure 5:
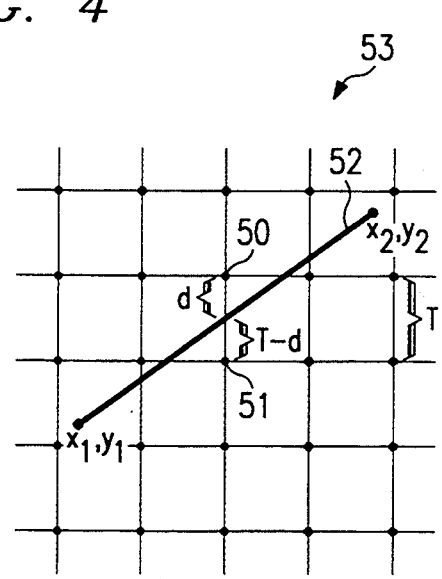
FIG. 5 illustrates a determination of the distance between a straight line and bounding pixels.

Referring next to FIG. 5, there is illustrated straight line 52 passing between pixels 50 and 51 within pixel array 53. Distance d is determined so that pixel 51 is illuminated according to the proportion d/T and pixel 50 is illuminated with respect to the proportion (T-d)/T. The result of the proportional illuminations along the pixels lying within the vicinity of straight line 52 is a smoother appearing representation of line 52 with practically no jagged appearance.

Figure 6:
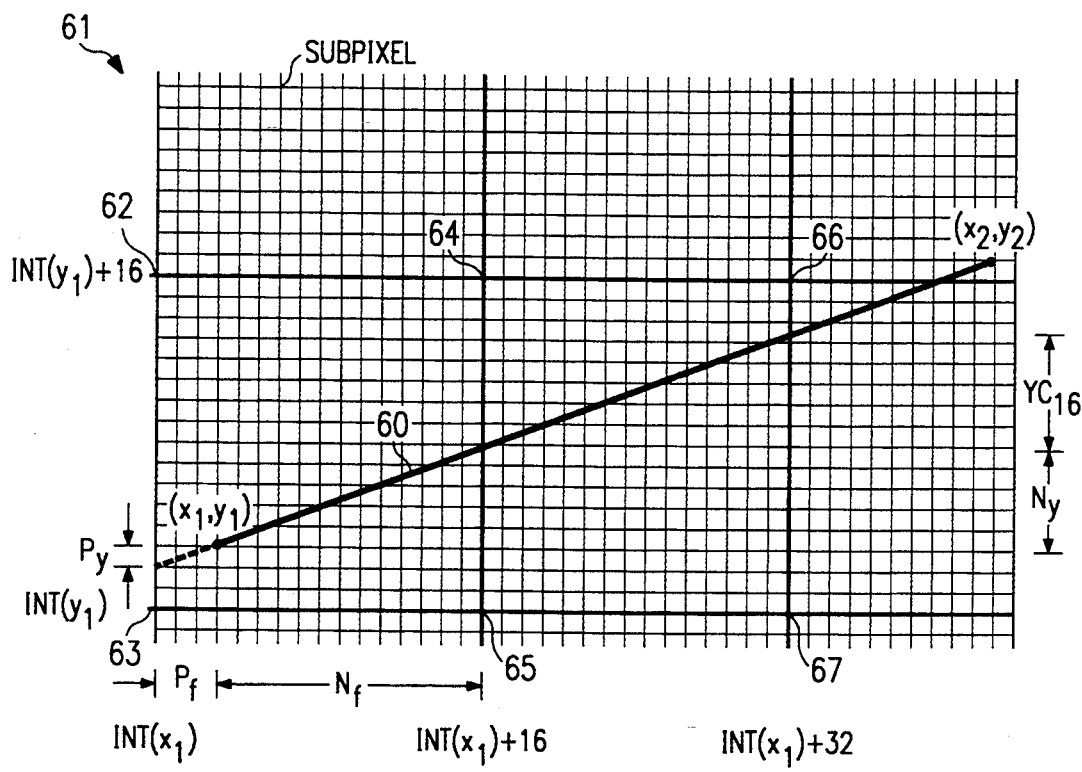
FIG. 6 illustrates a desired straight line lying within a pixel array subdivided into subpixels.

Referring next to FIG. 6, the present invention subdivides the aforementioned distance T between each pixel within array 61 into 16 equal portions, resulting in 15 subpixel locations lying between each pixel within array 61. Note that these subpixels are not actual locations where pixels reside, but are merely used within the present invention to determine within a desired accuracy where a straight line lies between two adjacent pixel locations (i.e., d is ascertained).

Note that the subdivision of the distance between adjacent pixels into 16 subpixel regions is a design choice and that any other number of subpixels could be chosen depending upon the precision desired and the sophistication of the hardware utilized. Sixteen was chosen in this embodiment since a 4-bit binary word may represent any of the subpixel locations 1–15.

Further note that though the illumination intensity of adjacent pixels on each side of straight line 60 is determined in a linear manner, the system of the present invention may also use gamma correction in a manner well known in the art to provide a logarithmic scale for providing color and contour to the displayed image. Gamma correction is often employed since the visible intensity of a pixel may not bear a linear relationship with the value associated with a pixel. This occurs due to non-linearities in display devices. An effective anti-aliasing process, such as the one disclosed herein, will factor this non-linearity into consideration and produce intensities more appropriate to what the human eye perceives. Gamma correction, which is basically compensating for non-linearities in the phosphor response of cathode ray tubes (CRTs), is achieved by selecting a color palette with the shades in each row ordered non-linearaly to compensate for the non-linearities of the CRT.

Returning to FIG. 6, there is illustrated line 60, having start point $x_1$, $y_1$ and end point $x_2$, $y_2$, lying within pixel array 61 having pixels 62–69 labeled.

The general strategy of the present invention is to provide for rasterization of line 60 between the points $x_1$, $y_1$ and $x_2$, $y_2$. As can be seen, all the coordinates along line 60, which satisfy the line equation for line 60, have fractional components.

As previously stated, an equation of a line, such as line 60, can be reduced to its implicit form:

$$F(x,y) = ax + by + c = 0 \qquad \text{(Equation 2)}$$

Every point on line 60 will satisfy this equality. $F(x,y)$, known as the determinant, for points within array 61 above line 60 will be negative, and for points below line 60 will be positive.

With subpixels, every point (x,y) on line 60 will lie exactly on or between two subpixels. Bresenham's midpoint calculation can be used to ascertain the value of the determinant at a point exactly midway between any two subpixels. The present invention utilizes this calculation to establish the nearest subpixel coordinate for every integer value of x (the x integer boundaries) between start point $x_1$, $y_1$ and end point $x_2$, $y_2$.

In the discussion to follow, the following terms shown in FIG. 6 are defined:

$P_f$ is equal to the horizontal distance from $x_1$ to the first x integer boundary (int ($x_1$)) prior to the start of line 60.

$P_y$ is equal to the change in the y direction due to $P_f$; the lower subpixel integer bound of $P_y$ will be utilized if $P_y$ does not equal exactly a subpixel integer value (i.e., if $P_y$ includes a fractional portion of a subpixel, the fractional portion will be dropped).

$N_f$ is equal to $16 - P_f$ $N_y$ is equal to the change in the y direction due to $N_f$; the lower integer bound of $N_y$ is utilized.

$yc_{16}$ is equal to the change in the y direction due to 16 subpixel movements in the x direction; the lower integer bound of $yc_{16}$ is utilized. A method for ascertaining $yc_{16}$ is discussed in detail below.

As previously discussed, by ascertaining the determinant at x integer boundaries along the x axis, a determination may be made of the location of the subpixel nearest to the intersection of line 60 and each x integer boundary.

Please note that line 60 has been extended back from start point $x_1$, $y_1$ to intersect x integer boundary int($x_1$). The determinant at this intersection is required in order to establish the illumination intensities of pixels 62 and 63. Since start point $x_1$, $y_1$ lies a certain distance away from x integer boundary int($x_1$), a special process is required to determine the illuminations of pixels 62 and 63 in order to approximate the display of start point $x_1$, $y_1$.

Since the y coordinate of the extension of line 60 intersecting x integer boundary int($x_1$) lies between $$y = y_1 - P_y \quad \text{(Equation 3)}$$

and $$y = y_1 - P_y - 1 \quad \text{(Equation 4)}$$

the determinant at $x = x_1 - P_f$, $y = y_1 - P_y - \frac{1}{2}$ is determined.

The determinant F(x,y) calculated in Equation 1 may be multiplied times 2 as follows:

$$2ax + 2by + 2c = 0 \quad \text{(Equation 5)}$$

The values for x and y are inserted as follows:

$$2a(x_1 - P_f) + 2b(y_1 - P_y - \tfrac{1}{2})2c = 0 \quad \text{(Equation 6)}$$

Since $2ax_1 + 2by_1 + 2c = 0$, these terms may be removed resulting in the determinant at this intersection:

$$E_2 = -2aP_f - 2bP_y - b = 0 \quad \text{(Equation 7)}$$

As a result, the subpixel nearest the intersection of the extension of line 60 and int($x_1$) may be established. In a process to be discussed below with respect to FIG. 9, this determinant will be utilized to establish the illumination intensities of pixels 62 and 63.

Next, the determinant for the intersection of line 60 and x integer boundary int($x_1$)+16 is calculated as follows:

$$x = x_1 + N_f \quad \text{(Equation 8)}$$

$$y = y_1 + N_y + \tfrac{1}{2} \quad \text{(Equation 9)}$$

Therefore $$2a(x_1 + N_f) + 2b(y_1 + N_y + \tfrac{1}{2}) + 2c + 0 \quad \text{(Equation 10)}$$

since $$2ax_1 + 2by_1 + 2c = 0 \quad \text{(Equation 11)}$$

Then $$E_1 = 2aN_f + 2bN_y + b = 0 \quad \text{(Equation 12)}$$

The above values will permit a determination of precisely the y coordinates (in the subpixel domain) at the first x integer boundary int($x_1$) (for the extension of line 60) and, at the second x integer boundary int($x_1$)+16, which is the first x integer boundary in the positive x direction that intersects line 60 (in the subpixel domain).

The value of the y coordinate at the intersection of line 60 and every integer boundary subsequent to int($x_1$)+16 in the x direction is also desired. With respect to line 60, this entails ascertaining the determinant at the intersection of line 60 and the x integer boundary intersecting pixels 66 and 67, int($x_1$)+32.

The system embodying the present invention has the capability to efficiently establish these values without requiring a determination of the y coordinates at each and every subpixel location lying near line 60 between x integer boundaries.

This is performed utilizing fixed correction values referred hereinafter as a northeast correction (NECOR16) and an east correction (ECOR16).

Referring again to FIG. 6, it can easily be determined that line 60 has an angle with respect to the x axis of less than 45°. Thus, line 60, from left to right, progresses in a generally "easterly" or "northeasterly" direction. In other words, line 60's major direction of movement is in the positive x direction. Therefore, as line 60 progresses in the positive x direction through pixel array 61 from subpixel to subpixel, it will traverse either a subpixel "east" or "northeast" of the previous subpixel.

The "northeast" correction and "east" correction values (which are further described below) have been found empirically to provide the correct constant value to add to the determinant ascertained for the previous x integer boundary in order to ascertain the value of the determinant at a subsequent x integer boundary in one efficient step. This relieves the present invention from ascertaining determinants (and the resulting subpixel location nearest line 60) at each value of x (in the subpixel domain) between x integer boundaries in order to eventually reach each subsequent x integer boundary, since to do so would not be economical and efficient because these values are useless within the present invention for establishing illumination intensities of pixels.

Figure 7A:
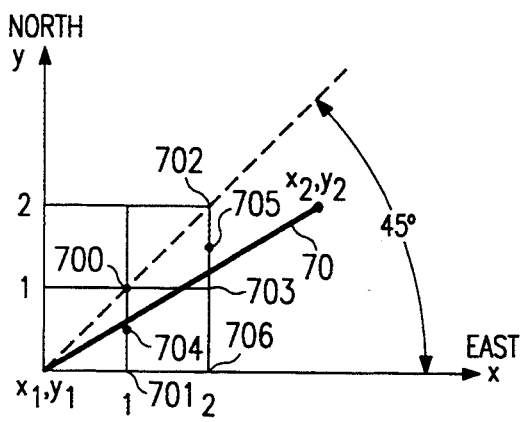
FIG. 7a illustrates a straight line traversing in a northeasterly direction.
Figure 7B:
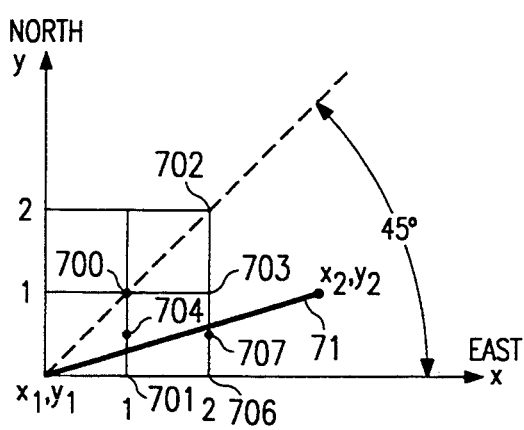
FIG. 7b illustrates a straight line traversing in an easterly direction.

Referring next to FIGS. 7a and 7b, there is illustrated a graphical explanation for using a northeast correction or an east correction when attempting to determine the range of subpixels through which a straight line, such as line 60 in FIG. 6, is passing through.

In FIG. 7a, there is illustrated straight line 70 having start points $x_1$, $y_1$ and end points $x_2$, $y_2$, and beginning at $x = 0$, $y = 0$ and passing between subpixels 700 and 701 at $x = 1$ and subpixels 702 and 703 at $x = 2$. As previously discussed, line 70 has an angle less than 45° with respect to the x axis for purposes of this discussion. For straight lines lying within the other seven octants (Cartesian coordinates), the present invention remains operable.

For purposes of FIG. 7a, $x=0$ corresponds to an x integer boundary, such as $int(x_1)=16$, as shown in FIG. 6; then, $x=1$ corresponds to $int(x_1)+17$, and $x=2$ corresponds to $int(x_1)+18$.

By using the previously described method for determining $E_1$, the value of the determinant for line 70 at midpoint 704 may be calculated. As depicted, line 70 lies above midpoint 704, which would correspond to a positive determinant $E_1$.

Additionally, as the graph in FIG. 7a depicts, line 70 must pass between subpixel 702 and 703. The region between subpixels 702 and 703 is "northeast" from the region between subpixels 700 and 701. Thus, as long as line 70 is less than 45° with respect to the x axis and passes between subpixel 700 and midpoint 704, it will have to pass between subpixels 702 and 703. Therefore, all that is required is to determine whether line 70 passes nearer to subpixel 702 or subpixel 703. Thus, the determinant at midpoint 705 must be ascertained in the same manner as the determinant for midpoint 704 was ascertained.

As previously described, if the determinant at midpoint 705 is negative, then line 70 passes below midpoint 705, and is thus closer to subpixel 703 than to subpixel 702. Conversely, if the determinant value at midpoint 705 is positive, then line 70 passes between subpixel 702 and midpoint 705, resulting in an establishment that line 70 at $x=2$ lies at the integer value associated with subpixel 702. This would continue from subpixel to subpixel along line 70 until the next x integer boundary, $int(x_1)+32$ is reached.

The present invention avoids incrementing from subpixel to subpixel near line 70 in-between x integer boundaries, since this would consume more time and require unnecessary computations. Since it has been shown above that line 70 progresses in a northeasterly direction, the task of "jumping" to the next x integer boundary would require a determination of the northeast correction value for the next x integer boundary crossed by line 70, which in this instance would lie at $x=16$ (since $x=0$ was defined as the first x integer boundary crossed by line 70) if line 70 extended that far.

As described, midpoint 705 is "northeast" from midpoint 704. To move to midpoint 705, x must be incremented by 1 subpixel, and y must be incriminated by 3/2 subpixels. Instead of requiring the process of the present invention to increment through each subpixel location between x integer boundaries, the process jumps right to the next x integer boundary using northeast or east corrections to ascertain the determinant at the midpoint location between the subpixels through which a line passes. Thus, the determinant must be ascertained at the midpoint lying at the coordinates $x+16$, $y+yc_{16}+3/2$. Since these coordinates can be entered into the equation of the line, the determinant value at these coordinates may be directly ascertained so that it may be efficiently determined whether or not the line passes nearer the top or bottom subpixel adjacent to the aforementioned midpoint at this next x integer boundary. The process continues for each x integer boundary that the line crosses.

Referring next to FIG. 7b, there is shown line 71 with start point $x_1$, $y_1$ and end point $x_2$, $y_2$. As depicted, line 71 passes below midpoint 704, and thus must pass between subpixel 703 and 706 at subpixel location $x=2$. Thus, when the determinant at midpoint 704 is established and shown to be a negative number, it is automatically known that line 71 passes below midpoint 704 and will subsequently pass below subpixel 703 and above subpixel 706. The question remaining is whether or not line 71 passes above or below midpoint 707. Thus, the determinant value at midpoint 707 must be ascertained so that it may be known whether line 71 passes nearer to subpixel 703 or subpixel 706.

To find the determinant at midpoint 707, the x value is incremented by 1 subpixel and the y value is incremented by ½ subpixel. To extrapolate this to the next x integer boundary, as previously done with respect to FIG. 7a, the x value must be incremented by 16, while they y value must be incremented by $yc_{16}+\frac{1}{2}$.

This determinant value may be directly calculated, and is referred to as an east correction (ECOR16). This east correction may then be added to subsequent determinant values calculated at each x integer value in order to provide a quick determination of which subpixels the line passes closes to at each x integer boundary.

The following describes the necessary computations for a northeast correction to the next x integer boundary. Since the midpoint of a northeast subpixel will lie one subpixel in the x direction and a half of a subpixel in the y direction, NECOR16 may be computed by increasing x by 16 and increasing y by $yc_{16}+3/2$ in order to obtain the midpoint between the two subpixels at the next integer boundary through which line 60 passes. NECOR16 may be determined as follows:

$$ax+by+c=0 \qquad \text{(Equation 13)}$$

$$2ax+2by+2c=0 \qquad \text{(Equation 14)}$$

$$2a(x+16)+2b(y+yc_{16}+3/2)+2c=0 \qquad \text{(Equation 15)}$$

$$2ax+32a+2by+2byc_{16}+3b+2c=0 \qquad \text{(Equation 16)}$$

Since
$$2ax+2by+2c=0 \qquad \text{(Equation 17)}$$

Then
$$NECOR16=32a+2byc_{16}+3b \qquad \text{(Equation 18)}$$

Correspondingly, it follows that $ECOR16=32a+2byc_{16}+b$, since y is increased by $yc_{16}+\frac{1}{2}$.

Figures 12, 13:
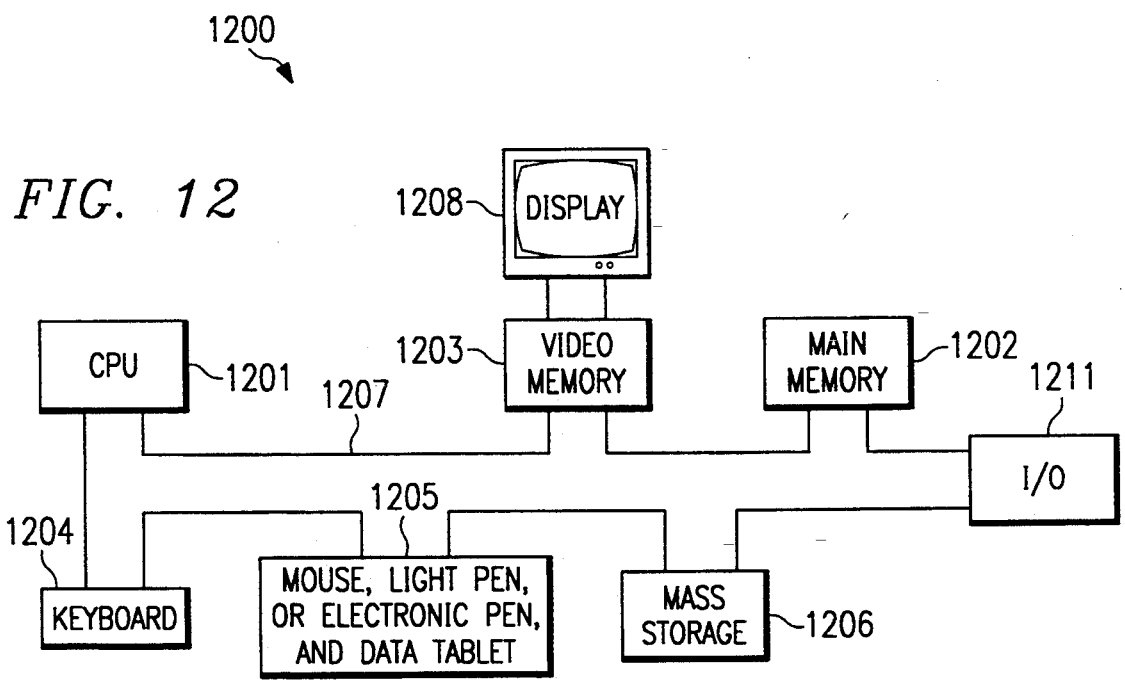
FIG. 12 illustrates a data processing system embodying the present invention.
FIG. 13 illustrates a look-up table utilized for determining illumination intensities at end points of a straight line.

Referring next to FIG. 12, there is illustrated a preferred embodiment of the present invention implemented within hardware system 1200 as part of a data processing system. System 1200 includes CPU 1201, main memory 1202, video memory 1203, keyboard 1204 for user input, supplemented by conventional mouse (or light pen, electronic pen and data tablet, etc.) 1205, and mass storage 1206, which may include both fixed and removable media using anyone or more of magnetic, optical or magneto-optical storage technology or any other available mass storage technology.

These components are interconnected via conventional bidirectional system bus 1207. Bus 1207 contains address lines for addressing any portion of memory 1202 and 1203. System bus 1207 also includes a data bus for transferring data between and among CPU 1201, main memory 1202, video memory 1203, mass storage 1206 and input/output (I/O) port 1211.

In the preferred embodiment of system 1200, CPU 1201 may be any suitable microprocessor or microcomputer. I/O port 1211 enables system 1200 to have access to the "outside world" (e.g., external systems and processes).

Main memory 1202 of system 1200 is a conventional dynamic random access memory of suitable size. Video memory 1203 is a conventional dual-ported video random access memory, which may include frame buffers, which hold the contents of a single screen image. Video memory 1203 provides video data for display upon display 1208, which in the preferred embodiment of the present invention is a cathode-ray tube (CRT) raster display monitor. However, display 1208 may be a liquid-crystal, cold-cathode, or any other pixel-based display.

Figure 8A:
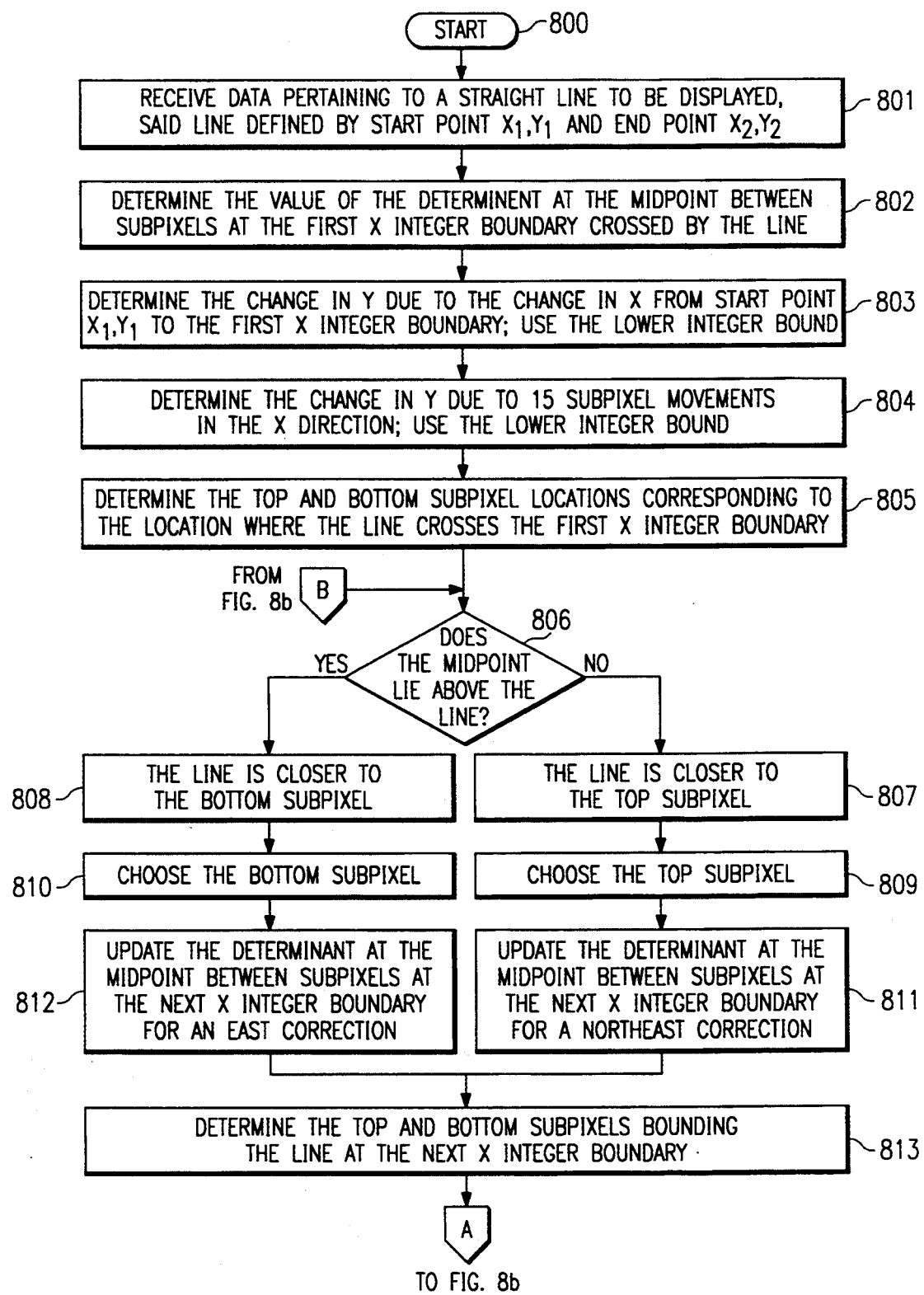
figures 8A-8B illustrates a flow diagram describing the process of the present invention.
Figure 8B:
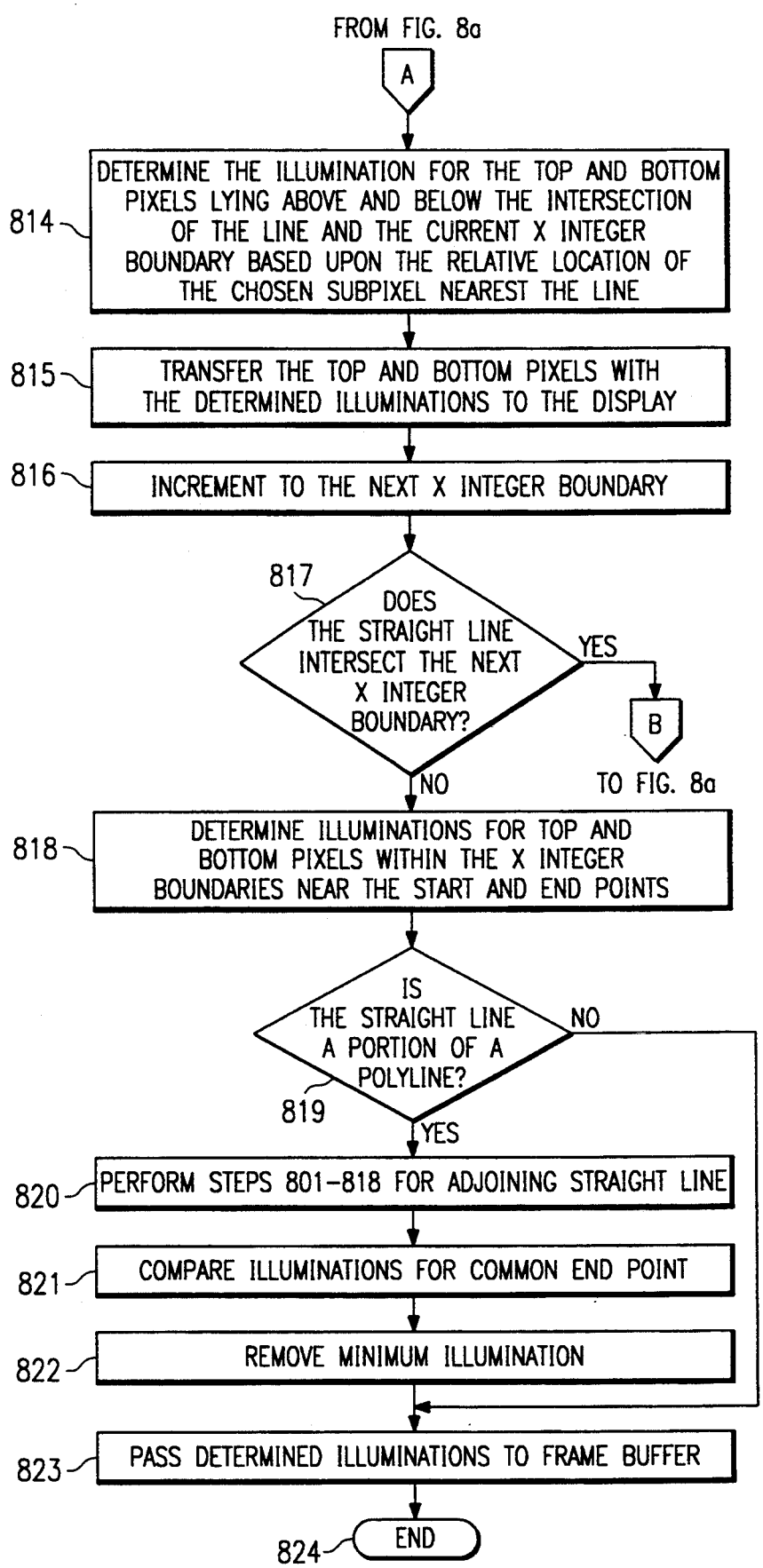

Referring next to FIG. 8, there is illustrated a flow diagram describing the process used within system 1200 for providing anti-aliasing of an angled straight line within a graphical display according to the present invention. Beginning at step 800, the process proceeds to step 801 wherein it receives pixel data pertaining to the straight line to be displayed. The straight line is defined by start point $x_1$, $y_1$ and end point $x_2$, $y_2$. Thereafter, at step 802, the process determines the value of the determinant at the midpoint between the two subpixels bounding the straight line at the first x integer boundary.

Thereafter, at step 803, the process determines the change in y due to the change in x from start point $x_1$, $y_1$ to the first x integer boundary. Any fractional component of this change in y is dropped so that only the lower subpixel integer bound is utilized.

Next, at step 804, the process determines the change in y of the straight line due to 16 subpixel movements in the x direction. Again, the lower integer bound is utilized. Thereafter, at step 805, the process determines the top and bottom subpixel locations bounding the location along the first x integer boundary where the line crosses this boundary.

Next, at step 806, the process utilizes the value of the determinant at the midpoint between the aforementioned subpixels to establish whether or not the midpoint lies above or below the line. If the straight line lies above the midpoint, the process proceeds to step 807 where it notes that the line is closer to the top subpixel. If the midpoint lies above the line, the process proceeds from step 806 to step 808 and notes that the line is closer to the bottom subpixel.

From step 807, the process proceeds to step 809 to choose the top subpixel as the value of y for the straight line at this x integer boundary. Correspondingly, from step 808, the process would proceed to step 810 to choose the bottom subpixel.

From step 809, the process proceeds to step 811 to update the value of the determinant at the midpoint between those adjacent subpixels bounding the straight line at the next x integer boundary using northeast correction value NECOR16. Likewise, from step 810, the process would proceed to step 812 to update the value of the determinant at the midpoint between subpixels at the next x integer boundary using east correction value ECOR 16.

Both steps 811 and 812 proceed next to step 813, which determines the top and bottom subpixels bounding the line at the next x integer boundary.

Thereafter, at step 814, the illumination intensities for the top and bottom pixels lying above and below the intersection of the line and the current x integer boundary are determined based upon the relative location of the subpixel chosen in either step 809 or step 810. During this step, system 1200 will concatenate the 4 most significant bits (MSB) of the 8-bit foreground color register value to be displayed with the established illumination intensity value for each of the top and bottom pixels (which is also 4 bits wide) and create a byte word to be written into the frame buffer at the given x,y location.

Note, for RGB display modes with non-zero background and foreground colors, the actual intensities for the top and bottom pixels bounding the straight line will be as follows:

The bottom pixel will be illuminated by a sum of the foreground color in a proportion equal to the distance of the subpixel from the bottom pixel divided by the total distance between the top and bottom pixels, plus the background color in a proportion equal to the ratio of the distance from the subpixel to the top pixel and the total distance between the top and bottom pixels.

The top pixel will have an illumination that is the sum of the foreground color in proportion to the distance between the top pixel and the chosen subpixel to the distance between the top and bottom pixels, plus the background color in proportion to the ratio of the distance between the chosen subpixel and the bottom pixel and the distance between the top and bottom pixels.

Thereafter, in step 815, the present invention transfers the top and bottom pixel illumination intensities to the frame buffer.

Next, in step 816, the process proceeds to the next x integer boundary.

Thereafter, at step 817, the system determines whether or not the straight line intersects this next x integer boundary. If so, the process returns to step 806 in order to establish the illumination intensities for the top and bottom pixels bounding this intersection of the straight line and this next x integer boundary.

If this next x integer boundary is not intersected by this straight line, the process proceeds to step 818 to establish the illumination intensities for the top and bottom pixels along the x integer boundaries nearest the start and end points of the straight line, which do not intersect the straight line. This process is described below with respect to FIGS. 9 and 13.

Figure 10:
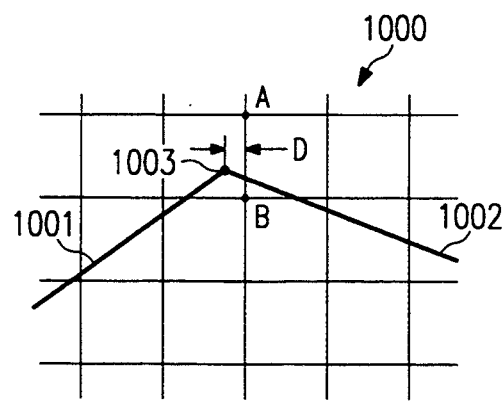
FIG. 10 illustrates the determination of illumination intensities at the juncture of a polyline.

Next, at step 819, the system determines whether or not the straight line is a portion of a polyline (see FIGS. 2a and 10). If not, the system moves forward to step 823. If, however, the straight line is a portion of a polyline, the system proceeds to step 820 wherein it proceeds through the process described in steps 801–818 for the adjoining straight line. Thereafter, at step 821, the system compares the illumination intensities for the end points where the two straight lines intersect. Thereafter, at step 822, the system only retains the illumination intensities for the end point having the maximum intensities.

Next, at step 823, the illumination intensity values are transferred to the frame buffer for subsequent transfer to the display, before the process ends at step 824.

Figure 9:
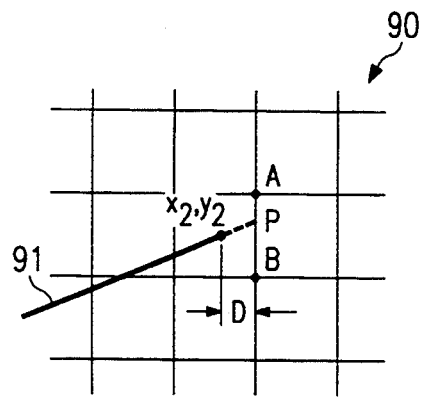
FIG. 9 illustrates the determination of illumination intensities at an end point of a straight line.

Referring next to FIG. 9, there is illustrated pixel array 90 with end point $x_2$, $y_2$ of line 91 ending a distance D from the x integer boundary passing through pixels A and B. If line 91 were to actually end at point P, then pixel A would be lit with an intensity proportional to PB and pixel B would be lit with an intensity proportional to AP. Intersection point P is established by ascertaining the determinant in the manner previously described as if line 91 extended to this next x integer boundary.

Since line 91 does not end at an x integer boundary, the present invention reduces the intensities of pixels A and B proportional to the distance D (in the major direction). Therefore, the intensity for top pixel A is proportional to PB/D, and the intensity for bottom pixel B is proportional to AP/D. These proportions are used in a manner described below in order to display end point $x_2$, $y_2$. Naturally, if D=0, then the corresponding mixes for pixels A and B would be proportional to PB and AP, respectively.

Regarding start point $x_1y_1$, refer back to FIG. 6, wherein as previously described with respect to Equations 3–7, the determinant of the extension of line 60 back to x integer boundary int($x_1$) was established. If line 60 were to actually cross x integer boundary int($x_1$), the illumination intensities for pixels 62 and 63 would be ascertained in the manner previously described. However start point $x_1$, $y_1$ of line 60 lies a distance $P_f$ from int($x_1$). Therefore, using the same process described with respect to FIG. 9 and further detailed below, the illumination intensities for pixels 62 and 63 may be determined, thus providing a representation of start point $x_1,y_1$.

As previously described, when the subpixel location along an x integer boundary, which is crossed by the straight line, is ascertained, the relative illumination intensities for the top and bottom pixels bounding the straight line at this x integer boundary are determined. Since the region between pixels has been subdivided into 16 subpixels, the value for the location of the chosen subpixel from the bottom pixel can be represented by a 4-bit word. Additionally, a 4-bit word can represent the subpixel distance between the chosen subpixel location and the top pixel.

These 4-bit words are each concatenated with the 4 MSB of the 8-bit word representing the color register value for the displayed straight line in order to ascertain the reduced intensity levels of the top and bottom pixels according to the ratios previously determined.

Also, as previously described, since the start and end points are usually located a certain distance away from an x integer boundary, the top and bottom pixels lying just beyond the start and end points, respectively, are reduced in intensity in proportion to that distance in the major direction between the start point, or end point, and the corresponding x integer boundary.

This is accomplished by first ascertaining the intensity levels for these pairs of top and bottom pixels as if the straight line intersected their respected x integer boundaries. This is accomplished in the manner previously described. The two MSB of the previously described 4-bit words describing the subpixel location where the extensions of the straight line intersect the x integer boundaries are then concatenated with the 2 MSB of the 4-bit words representing the distances in the major direction between the start and end points and their respective x integer boundaries lying immediately outside of the path of the straight line (e.g., distance $P_f$ in FIG. 6 and distance D in FIG. 9). The resulting 4-bit word is used to index table 1114 shown in FIGS. 11 and 13 in order to establish the 4-bit word that will be utilized to index the previously mentioned look-up table (table 1112 in FIG. 11) in order to ascertain the 8-bit word to pass on to the frame buffer.

The use of look-up table 1114 assists in reducing the amount of hardware needed to implement this portion of the present invention. The values in look-up table 1114 have been found empirically to satisfactorily enable the display of the start and end points of a straight line. Other implementations of table 1114 may be utilized, which are dependent upon the distance from a start or end point and the x integer boundary and the mix value associated with the intersection of the extended line and the x integer boundary.

Referring next to FIG. 10, there is illustrated pixel matrix 1000 wherein lies a polyline formed by the intersection of lines 1001 and 1002. The intensity values for pixels A and B (in the same manner described with respect to start and end points) are determined for point 1003 separately for each of lines 1001 and 1002, and retains only the maximum intensity values as described within steps 819–822 in FIG. 8.

As noted previously, the value $yc_{16}$ is needed to ascertain the determinants at x integer boundaries. The following discussion describes a preferred method for ascertaining $yc_{16}$.

Since all positional values will be rounded to subpixel integer values, and since in the preferred embodiment the pixel array has been subdivided into 16 equal subpixel regions, all these positional values, including $yc_{16}$, may be represented by 4-bit words. Since the computation of $yc_{16}$ would require a division operation, which is not desired since it requires additional hardware, the present invention computes $yc_{16}$ in a manner similar to that previously described with reference to establishing subpixel locations between bounding pairs of pixels.

First, since $yc_{16}$ is the change in y due to 16 subpixel movements in the x direction, x is incremented by 16. Next, y is incremented by 8 subpixels, and the determinant is calculated at this subpixel location. If the determinant establishes that the straight line lies above this location, then it is known that $yc_{16}$ will include at least 8 subpixels. Therefore, the first most significant bit of the 4-bit word to represent $yc_{16}$ is inserted with a 1 bit. If the straight line lies below this first subpixel location, then it is known that $yc_{16}$ is equal to less than 8 subpixels. As a result, the first most significant bit is inserted with a 0 bit.

Next, if the straight line lies above the eight pixel increment, then y is increased by 4 subpixels from the 8 subpixel increment value.

However, if the straight line lies below the previously determined eight pixel increment, y is decreased by a 4 subpixel increment.

For either situation, the determinant is again ascertained for the new subpixel increment. Whether or not the straight line lies above or below the new subpixel increment location determines whether or not a 1 or 0 is placed within the second most significant bit of the 4-bit word to represent $yc_{16}$. This process is continued until bit values are placed within all four bits of the 4-bit word to represent $yc_{16}$.

As an example, if the above iterations were performed for a line lying near the 13th subpixel, corresponding to an integer value for $yc_{16}$ equal to 13, then the 4-bit word representing $yc_{16}$ would equal to 1110.

Figure 11:
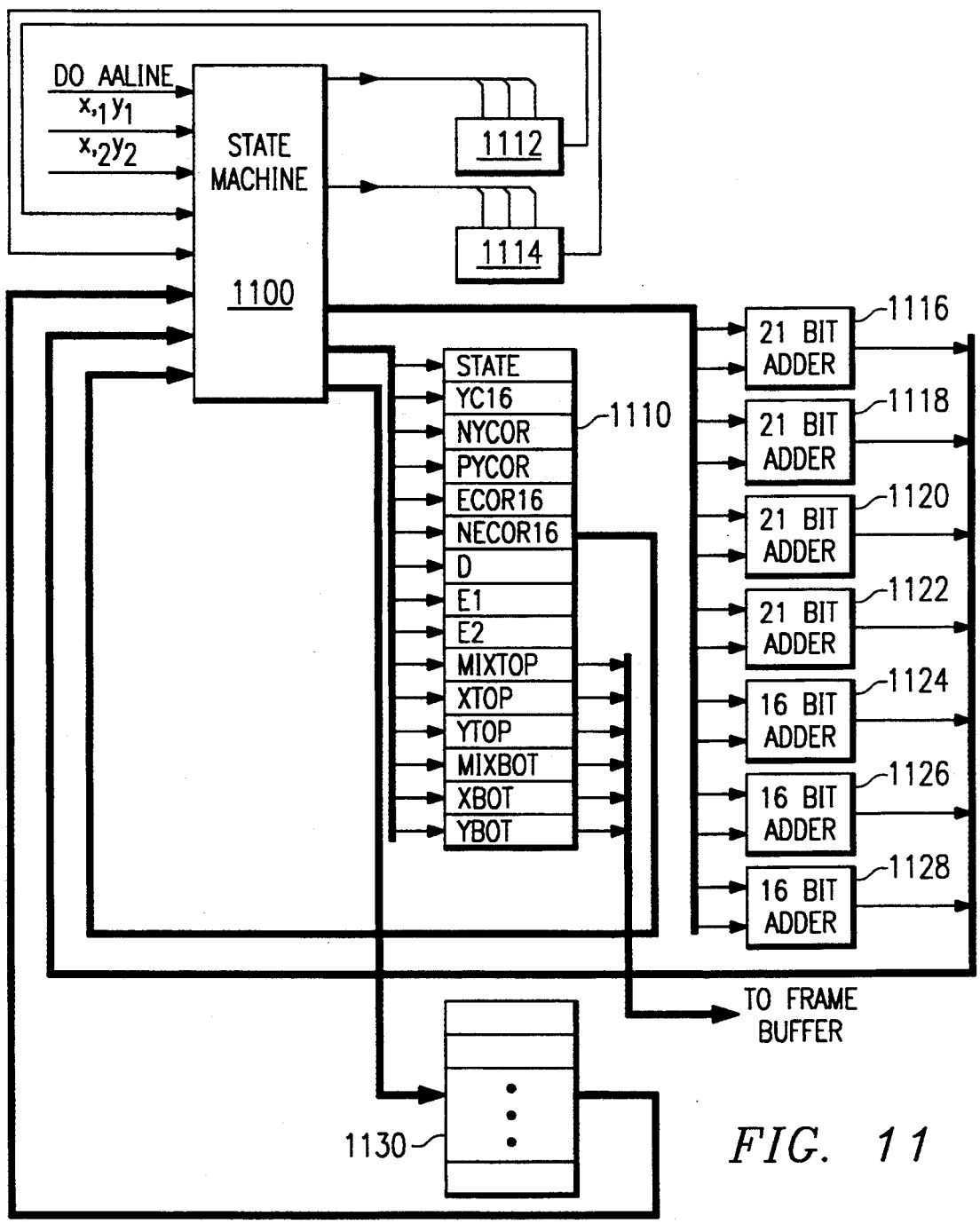
FIG. 11 illustrates apparatus embodying the present invention.

Referring next to FIG. 11, there is shown an alternate embodiment of the present invention, wherein the process described with respect to FIG. 8 is implemented in a state machine, which is implicated within system 1200 to control CPU 1201 of FIG. 12. The state machine may be configured by any method well known in the art, based upon the process described in FIG. 8.

State machine 1100 is coupled to latches 1110 and 1130, adders 1116–1128 and look-up tables 1112 and 1114, which may be implemented within system 1200. Latches 1110 and 1130 and adders 1116–1128 may be separately coupled to system 1200 (for example, via I/O 1211), or implemented within CPU 1201 or main memory 1202. Look-up tables 1112 and 1114 may be implemented within memory 1202.

The inputs to state machine 1100 are a Perform Anti-Aliasing Command and data in the form of the start point $x_1$, $y_1$ and end point $x_2$, $y_2$ of a line to be processed.

State machine 1100 receives the aforementioned inputs and initiates the process described within FIG. 8. During the process, as previously described, various variables are ascertained, modified and sometimes incremented. Latches 1110 are operable to receive some of these variables from state machine 1100, and store them until again required by state machine 1100. Additionally, latches 1130 are operable to store various control variables, which are not detailed herein, but which are traditionally required when implementing and operating a state machine.

Adders 1116–1128 are utilized by state machine 1100 to ascertain, modify and increment some of the variables.

Look-up table 1112 is utilized by state machine 1100 when establishing the illumination intensities for the top and bottom pixels. Look-up table 1114 is utilized by state machine 1100 to assist in the establishment of illumination intensities at the start and end points of a straight line. Look-up table 1114 includes the table illustrated in FIG. 13.

As each illumination intensity value (Mixtop, Mixbot) are established for each top pixel (Xtop, Ytop) and bottom pixel (Xbot, Ybot), state machine 1100 causes these values to be transferred from latches 1110 to the video frame buffer for subsequent display.

Although the present invention and its advantages have been described in detail, it should be understood that various changes, substitutions and alterations can be made herein without departing from the spirit and scope of the invention as defined by the appended claims.

What is claimed is:

1. A data processing system operable for displaying anti-aliased lines on a display device including a matrix array of pixels, said system comprising:

means for receiving data pertaining to a line to be displayed by said matrix array of pixels, said data including start and end points for said line, said data positioning said line relative to said pixels within said matrix array, wherein said line traverses two or more axes adjoining centers of adjacent pixels within said matrix array of pixels;

means for subdividing said two or more axes adjoining centers of adjacent pixels into N subpixel regions, wherein N is greater than 1;

means for ascertaining a relative position of said line with respect to a pair of adjacent pixels bounding said line at a first one of said two or more axes adjoining centers of adjacent pixels within said matrix array of pixels, wherein said ascertaining means further comprises means for determining which of said N subpixel regions are nearest said line at said first one of said two or more axes adjoining centers of adjacent pixels within said matrix array of pixels; and means for determining an illumination intensity of each of said adjacent pixels bounding said line at a first one of said two or more axes adjoining centers of adjacent pixels within said matrix array of pixels, said illumination intensities dependent upon said relative position, wherein said illumination intensity for a first one of said pair of adjacent pixels bounding said line at a first one of said two or more axes is proportional to a ratio of (a) a distance between (i) a second one of said pair of adjacent pixels bounding said line at a first one of said two or more axes and (ii) said N subpixel region nearest said line at said first one of said two or more axes and (b) a total distance between said pair of adjacent pixels bounding said line at a first one of said two or more axes adjoining centers of adjacent pixels within said matrix array of pixels, wherein said illumination intensity for said second one of said pair of adjacent pixels bounding said line at a first one of said two or more axes is proportional to a ratio of (a) a distance between (i) said first one of said pair of adjacent pixels bounding said line at a first one of said two or more aces and (ii) said N subpixel region nearest said line at said first one of said two or more axes and (b) a total distance between said pair of adjacent pixels bounding said line at a first one of said two or more axes adjoining centers of adjacent pixels within said matrix array of pixels.

2. The data processing system recited in claim 1 wherein said end point is displayed by a pair of adjacent pixels bounding an extension of said line beyond said end line, wherein an illumination intensity for a first one of said pair of adjacent pixels bounding said extension of said line is proportional to a ratio of (a) a distance between (i) a second one of said pair of adjacent pixels bounding said extension of said line and (ii) said N subpixel region nearest said extension of said line and (b) a total distance between said pair of adjacent pixels bounding said extension of said line, wherein an illumination intensity for said second one of said pair of adjacent pixels bounding said extension of said line is proportional to a ratio of (a) a distance between (i) said first one of said pair of adjacent pixels bounding said extension of said line and (ii) said N subpixel region nearest said extension of said line and (b) a total distance between said pair of adjacent pixels bounding said extension of said line.

3. The data processing system recited in claim 2 wherein said illumination intensities for said pair of adjacent pixels bounding said extension of said line are reduced in proportion to a distance between said end point and a straight line intersecting said pair of adjacent pixels bounding said extension of said line.

4. A method for illuminating pixels on a display device in a data processing system, said pixels representing a portion of a line to be displayed on said display device, said method comprising the steps of:

receiving data pertaining to a line to be displayed, said data including start and end points for said line and a straight line equation for said line, said data positioning said line relative to said pixels, wherein said line traverses two or more axes adjoining centers of adjacent pixels;

subdividing said two or more axes adjoining centers of adjacent pixels into N subpixel regions, wherein N is greater than 1;

ascertaining a relative position of an intersection of said line with a straight-line boundary intersecting a pair of said pixels bounding said line at a first one of said two or more axes adjoining centers of adjacent pixels, wherein said ascertaining step further comprises the step of determining which of said N subpixel regions are nearest said line at said first one of said two or more axes adjoining centers of adjacent pixels;

determining an illumination intensity for each of said pair of pixels bounding said line of said first one of said two or more axes adjoining centers of adjacent pixels, said illumination intensities dependent upon said relative position, wherein said illumination intensity for a first one of said pair of adjacent pixels bounding said line at a first one of said two or more axes is proportional to a ratio of (a) a distance between (i) a second one of said pair of adjacent pixels bounding said line at a first one of said two or more axes and (ii) said N subpixel at said line at said first one of said two or more axes and (b) a total distance between said pair of adjacent pixels bounding said line at a first one of said two or more axes adjoining centers of adjacent pixels, wherein said illumination intensity for said second one of said pair of adjacent pixels bounding said line at a first one of said two or more axes is proportional to a ratio of (a) a distance between (i) said first one of said pair of adjacent pixels bounding said line at a first one of said two or more axes and (ii) said N subpixel region nearest said line at said first one of said two or more axes and (b) a total distance between said pair of adjacent pixels bounding said line at a first one of said two or more axes adjoining centers of adjacent pixels; and incrementing directly to a second one of said two or more axes adjoining centers of adjacent pixels to determine an illumination intensity for each of a pair of pixels bounding said line at said second one of said two or more axes adjoining centers of adjacent pixels, wherein said illumination intensity for a first one of said pair of adjacent pixels bounding said line at said second one of said two or more axes is proportional to a ratio of (a) a distance between (i) a second one of said pair of adjacent pixels bounding said line at said second one of said two or more axes and (ii) said N subpixel region nearest said line at said second one of said two or more axes and (b) a total distance between said pair of adjacent pixels bounding said line at said second one of said two or more axes adjoining centers of adjacent pixels, wherein said illumination intensely for said second one of said pair of adjacent pixels bounding said line at said second one of said two or more axes is proportional to a ratio of (a) a distance between (i) said first one of said pair of adjacent pixels bounding said line at said second one of said two or more axes and (ii) said N subpixel region nearest said line at said second one of said two or more axes and (b) a total distance between said pair of adjacent pixels bounding said line at said second one of said two or more axes adjoining centers of adjacent pixels, wherein said N subpixel region nearest said line at said second one of said two or more axes is determined by inputting a coordinate of said first one of said two or more axes plus N into said straight line equation of said line.

5. A data processing system operable for displaying lines on a display device, said display including a matrix array of pixels, said system comprising:

a state machine implemented within a processor coupled to said system, said state machine including:

means for receiving data pertaining to a straight line to be displayed by said matrix array of pixels, said data including start and end points for said line and a straight line equation for said line, said data positioning said line relative to said pixels within said matrix array, wherein said line traverses two or more axes adjoining centers of adjacent pixels;

means for subdividing said two or more axes adjoining centers of adjacent pixels into N subpixel regions, wherein N is greater than 1;

means for ascertaining a relative position of said line with respect to a pair of pixels bounding said line at a first one of said two or more axes adjoining centers of adjacent pixels, wherein said ascertaining means further comprises means for determining which of said N subpixel regions are nearest said line at said first one of said two or more axes adjoining centers of adjacent pixels;

means for determining an illumination intensity for each of said bounding pixels, said illumination intensities dependent upon said relative position, wherein said illumination intensity for a first one of said pair of adjacent pixels bounding said line at a first one of said two or more axes is proportional to a ratio of (a) a distance between a second one of said pair of adjacent pixels bounding said line at a first one of said two or more axes and said N subpixel at said line at said first one of said two or more axes and (b) a total distance between said pair of adjacent pixels bounding said line at a first one of said two or more axes adjoining centers of adjacent pixels, wherein said illumination intensity for said second one of said pair of adjacent pixels bounding said line at a first one of said two or more axes is proportional to a ratio of (a) a distance between said first one of said pair of adjacent pixels bounding said line at a first one of said two or more axes and said N subpixel region nearest said line at said first one of said two or more aces and (b) a total distance between said pair of adjacent pixels bounding said line at a first one of said two or more axes adjoining centers of adjacent pixels; and means for incrementing directly to a second one of said two or more axes adjoining centers of adjacent pixels to determine an illumination intensity for each of a pair of pixels bounding said line at said second one of said two or more axes adjoining centers of adjacent pixels, wherein said illumination intensity for a first one of said pair of adjacent pixels bounding said line at said second one of said two or more axes is proportional to a ratio of (a) a distance between a second one of said pair of adjacent pixels bounding said line at said second one of said two or more axes and said N subpixel region nearest said line at said second one of said two or more axes and (b) a total distance between said pair of adjacent pixels bounding said line at said second one of said two or more axes adjoining centers of adjacent pixels, wherein said illumination intensity for said second one of said pair of adjacent pixels bounding said line at said second one of said two or more axes is proportional to a ratio of (a) a distance between said first one of said pair of adjacent pixels bounding said line at said second one of said two or more axes and said N subpixel region nearest said line at said second one of said two or more axes and (b) a total distance between said pair of adjacent pixels bounding said line at said second one of said two or more axes adjoining centers of adjacent pixels, wherein said N subpixel region nearest said line at said second one of said two or more axes is determined by inputting a coordinate of said first one of said two or more axes plus N into said straight line equation of said line; and a frame buffer for storing said illumination intensities, said frame buffer coupled to said processor and said display device.

6. The data processing system recited in claim 5 wherein said end point is displayed by a pair of pixels bounding an extension of said line.

7. The data processing system recited in claim 6 wherein said illumination intensities for said pair of pixels bounding said extension of said line are reduced in proportion to a distance between said end point and a straight line intersecting said pair of pixels bounding said extension of said line.

8. A data processing system operable for displaying an anti-aliased polyline on a display, said display including a matrix of pixels, said system comprising:

means for receiving data pertaining to a plurality of lines comprising said polyline to be displayed by said matrix array of pixels, said data including start and end points for said plurality of lines, said data positioning said polyline relative to said pixels within said matrix array;

means for ascertaining relative positions of said lines with respect to pair of pixels bounding said lines;

means for determining an illumination intensity for each of said bounding pixels, said illumination intensities dependent upon said relative positions;

means for displaying a representation of said lines;

means for independently establishing illumination intensities for those pairs of pixels representing each of said start and end points;

means for comparing said illumination intensities for said pairs of pixels representing common points between said plurality of lines; and means for deleting said compared illumination intensities having minimum values.

9. A method for displaying a line on a display device in a data processing system, said display device including an array of pixels arranged in a substantially orthogonal pattern, said method comprising the steps of:

receiving input data corresponding to a proposed polyline comprising a plurality of lines, said data including start and end points for said plurality of lines, to be displayed on said device, said input data including positional data operable to establish a desired location and position within said array of said plurality of lines wherein one of said lines traverses two or more axes adjoining centers of adjacent pixels;

subdividing said two or more axes adjoining centers of adjacent pixels into N subpixel regions, wherein N is greater than 1;

determining a relative position of said line crossing a first one of said two or more axes adjoining centers of adjacent pixels bounding said line;

establishing illumination intensities for said adjacent pixels bounding said line, said intensities dependent upon said position, wherein said illumination intensity for a first one of said pair of adjacent pixels bounding said line at a first one of said two or more axes is proportional to a ratio of (a) a distance between a second one of said pair of adjacent pixels bounding said line at a first one of said two or more axes and said N subpixel region nearest said line at said first one of said two or more axes and (b) a total distance between said pair of adjacent pixels bounding said line at a first one of said two or more axes adjoining centers of adjacent pixels, wherein said illumination intensity for said second one of said pair of adjacent pixels bounding said line at a first one of said two or more axes is proportional to a ration of (a) a distance between said first one of said pair of adjacent pixels bounding said line at a first one of said two or more axes and said N subpixel region nearest said line at said first one of said two or more axes and (b) a total distance between said pair of adjacent pixels bounding said line at a first one of said two or more axes adjoining centers of adjacent pixels;

independently establishing illumination intensities for those pairs of pixels representing each of said start and end points;

comparing said illumination intensities for said pairs of pixels representing common points between said plurality of lines; and deleting said compared illumination intensities having minimum values.

10. The method recited in claim 9, further comprising the step of:

illuminating said pairs of pixels according to said established intensities.

11. The method recited in claim 10 wherein said display device employs a liquid-crystal display.

12. The method recited in claim 10 wherein said display device employs a flat cathode display.

* * * * *

UNITED STATES PATENT AND TRADEMARK OFFICE
CERTIFICATE OF CORRECTION

PATENT NO. : 5,432,898
DATED : July 11, 1995
INVENTOR(S) : Lisa A. Curb, Chandrasekhar Narayanaswami and Avijit Saha It is certified that error appears in the above-indentified patent and that said Letters Patent is hereby corrected as shown below:

Col. 7, line 12, delete "," and insert --;--;

Col. 8, line 2, delete "+", sixth occurrence, and insert --=--;

Col. 16, line 17, delete "aces" and insert --axes--;

Col. 18, line 39, delete "aces" and insert --axes--;

Col. 19, line 23, after "matrix" insert --array--;

line 31, delete "pair" and insert --pairs--;

Col. 20, line 1, delete "of" and insert --for--; and line 2, delete "lines" and insert --lines,--. (1st occurr)

Signed and Sealed this

Fourth Day of June, 1996

Attest:

BRUCE LEHMAN

Attesting Officer     Commissioner of Patents and Trademarks